(12) United States Patent
Gould

(10) Patent No.: US 12,211,013 B2
(45) Date of Patent: Jan. 28, 2025

(54) METHOD AND APPARATUS FOR VEHICLE DAMAGE MAPPING

(71) Applicant: Degould Limited, Exeter (GB)

(72) Inventor: Daniel George Gould, Exeter (GB)

(73) Assignee: DEGOULD LIMITED, Exeter (GB)

( * ) Notice: Subject to any disclaimer, the term of this patent is extended or adjusted under 35 U.S.C. 154(b) by 0 days.

(21) Appl. No.: 18/217,054

(22) Filed: Jun. 30, 2023

(65) Prior Publication Data

US 2023/0342729 A1    Oct. 26, 2023

Related U.S. Application Data

(63) Continuation of application No. 16/608,977, filed as application No. PCT/GB2018/051110 on Apr. 27, 2018, now abandoned.

(30) Foreign Application Priority Data

Apr. 28, 2017 (GB) ........................... 1706800

(51) Int. Cl.
  *G06F 3/01* (2006.01)
  *G06Q 10/20* (2023.01)
(52) U.S. Cl.
  CPC ............. *G06Q 10/20* (2013.01); *G06F 3/016* (2013.01)
(58) Field of Classification Search
  CPC ................................. G06Q 10/20; G06F 3/016
  See application file for complete search history.

(56) References Cited

U.S. PATENT DOCUMENTS

| | | |
|---|---|---|
| 5,956,658 A | 9/1999 | McMahon |
| 8,230,362 B2 | 7/2012 | Couch |
| 8,756,085 B1 | 6/2014 | Plummer et al. |
| 9,103,743 B2 | 8/2015 | Couch |
| 9,189,960 B2 | 11/2015 | Couch et al. |
| 9,691,189 B1 | 6/2017 | Creath |
| 9,799,010 B1 | 10/2017 | Leise |
| 9,886,771 B1 | 2/2018 | Chen et al. |

(Continued)

FOREIGN PATENT DOCUMENTS

| | | |
|---|---|---|
| CN | 104346752 A | 2/2015 |
| KR | 1020140035852 A | 3/2014 |

(Continued)

OTHER PUBLICATIONS

The foreign references and the NPLs are not submitted herewith as they can be retrieved in the Parent U.S. Appl. No. 16/608,977, filed Oct. 28, 2019.

(Continued)

*Primary Examiner* — Shourjo Dasgupta
(74) *Attorney, Agent, or Firm* — Potomac Law Group, PLLC; John J. Penny, Jr.

(57) ABSTRACT

A method and apparatus for mapping damage on a vehicle, the method comprising: displaying a graphical user interface on a display device of a computing device which shows a first image representing a first view of a vehicle; defining a first coordinate system relative to the first image; detecting a first user input command provided via a user input device associated with the computing device, the first user input command being representative of an instance of damage observed on the vehicle; storing one or more sets of image coordinates representing the first user input command to map damage to the vehicle.

13 Claims, 8 Drawing Sheets

(56) References Cited

U.S. PATENT DOCUMENTS

| | | |
|---|---|---|
| 10,332,209 B1 | 6/2019 | Brandmaier et al. |
| 10,360,601 B1 | 7/2019 | Adegan |
| 10,846,627 B2 | 11/2020 | Schulz |
| 2002/0161533 A1 | 10/2002 | Uegaki |
| 2004/0148188 A1 | 7/2004 | Uegaki |
| 2006/0171704 A1 | 8/2006 | Bingle et al. |
| 2008/0267487 A1 | 10/2008 | Siri |
| 2011/0218825 A1 | 9/2011 | Hertenstein |
| 2011/0313951 A1 | 12/2011 | Cook |
| 2012/0297337 A1 | 11/2012 | Denis et al. |
| 2013/0120375 A1 | 5/2013 | Jin et al. |
| 2013/0325541 A1 | 12/2013 | Capriotti et al. |
| 2014/0306826 A1 | 10/2014 | Ricci |
| 2015/0097924 A1 | 4/2015 | Hauk |
| 2015/0106133 A1 | 4/2015 | Smith, Jr. |
| 2016/0266046 A1 | 9/2016 | Kuai et al. |
| 2016/0300406 A1 | 10/2016 | Hamamcioglu et al. |
| 2017/0109715 A1 | 4/2017 | Aguirre et al. |
| 2017/0148102 A1 | 5/2017 | Franke et al. |
| 2017/0293894 A1 | 10/2017 | Taliwal et al. |
| 2017/0301154 A1 | 10/2017 | Rozint |
| 2018/0012350 A1 | 1/2018 | Gangitano et al. |
| 2018/0299352 A1 | 10/2018 | Rose et al. |

FOREIGN PATENT DOCUMENTS

| | | |
|---|---|---|
| WO | 2005109263 A1 | 11/2005 |
| WO | 2012113084 A1 | 8/2012 |

OTHER PUBLICATIONS

Search report issued in International Application No. GB1706800.8 on Sep. 19, 2017.

International Search Report and Written Opinion issued in the International Application No. PCT/GB2018/051110, mailed on Jul. 17, 2018.

METHOD AND APPARATUS FOR VEHICLE DAMAGE MAPPING

The present application claims priority under 35 U.S.C. § 120 to U.S. Application Ser. No. 16/608,977 filed on Oct. 28, 2019, under 35 U.S.C. § 119 to Great Britain Application No. 1706800.8 filed on Apr. 28, 2017, and under 35 U.S.C. § 365 to International Application No. PCT/GB2018/051110 filed on Apr. 27, 2018. The entire contents of these applications are incorporated herein by reference in their entirety.

FIELD

This invention relates to methods and apparatus for recording instances of damage to a vehicle.

BACKGROUND

It can be desirable to assess the damage status of a vehicle throughout various stages of its lifespan.

For example, during manufacture of a motor vehicle, a damage assessment may be performed at a number of successive stages within the production process. During a damage assessment the vehicle is visually inspected by a person and any instances of damage to the vehicle are recorded in a damage report. This will be referred to herein as damage mapping. This information can be used to identify damage patterns such that corrective measures can be taken to improve the manufacturing process.

It is common for a vehicle damage assessment to involve a person using a pen or pencil to draw a graphical representation of observed damage on a piece of paper containing an image of the vehicle.

The present inventor has devised an improved method and apparatus for vehicle damage mapping.

SUMMARY

In accordance with the first aspect of the present invention there is provided a method for mapping damage on a vehicle, the method comprising:
  displaying a graphical user interface on a display device of a computing device which shows a first image representing a first view of a vehicle;
  defining a first coordinate system relative to the first image;
  detecting a first user input command provided via a user input device associated with the computing device, the first user input command being representative of an instance of damage observed on the vehicle;
  storing one or more sets of image coordinates representing the first user input command to map damage to the vehicle.

Thus, the method according to the first aspect provides a robust method for vehicle damage mapping which removes much of the subjectivity involved with prior art damage mapping systems. This can enable damage to be recorded more consistently and accurately, which can lead to better, more timely corrective measures being taken.

The first image can be a three dimensional model of the vehicle in which the Y axis origin for the first coordinate system is aligned with the vehicle longitudinal centre within the image, the X axis intersects or is adjacent to a furthermost forward portion of the front of the bumper of the vehicle within the image when viewed from a side and the Z axis origin intersects or is adjacent to the bottom of the tyres within the image when viewed from the front or side.

The first image can be a two dimensional side view image of the vehicle and the origin for the first coordinates system is parallel to the front of the bumper and the bottom of the tyres.

The method can further comprise:
  displaying on the display device a second image representing a second view of the vehicle;
  defining a second coordinate system relative to the second image;
  detecting a first user input command provided via the user input command device, the first user input command being representative of an instance of damage on the vehicle;
  storing one or more sets of image coordinates representing the first user input command to map damage to the vehicle.

The second image can be a two dimensional front or back view image of the vehicle and the origin for the second coordinates system is the vehicle centre and the bottom of the tyres.

The method can further comprise:
  detecting a stroke length and/or direction of the first user input command;
  determining a damage magnitude and/or direction; and
  storing the damage magnitude and/or direction associated with the first user input command.

Prior to the step of detecting the first user input command, the method can comprise a step of detecting a second user input command, the second user input command causing the GUI to display a magnified representation of part of the vehicle.

Thus, the method can enable a user to enlarge a relevant portion of the vehicle image, which can enable the first user input command (damage location input) to be a more accurate representation of where the instance of damage has been observed on the vehicle.

The method can comprise one or more further steps of detecting the second user input command, each second user input command causing the GUI to display a further magnified representation of the part of the vehicle.

The method can further comprise:
  detecting the first or a third user input command provided via the user input device;
  displaying a damage description menu such that a user can select a damage type corresponding to the observed instance of damage; and
  storing the user selected damage type associated with the first user input command.

The method can further comprise:
  detecting the first or a fourth user input command provided via the user input device;
  displaying a damage severity menu such that a user can select a damage severity level corresponding to the observed instance of damage; and
  storing the user selected damage severity level associated with the first user input command.

The method can further comprise:
  partitioning the image into a plurality of regions, each region representing one or more discrete components of the vehicle;
  determining the region(s) to which the first or second user input command(s) relate;
  accessing a database containing vehicle information relating to the plurality of regions; and
  using the vehicle information to modify information displayed on the GUI.

The step of modifying information displayed on the GUI can comprise displaying only damage types and/or damage severity levels applicable to the region(s).

Thus, the method can provide a more efficient GUI enabling damage mapping to be achieved in a timely manner, thereby resulting in less system power per mapping exercise. The method of this embodiment can also improve the accuracy of damage mapping by reducing the number of options available for selection in the damage description menu or damage severity menu i.e. not presenting options that do not apply to the region(s).

The step of storing damage information can comprise storing the damage information as a fixed length multi digit code representative of the damage information. Saving the damage information in a structured code can simplify downstream data collation and comparison.

In accordance with a second aspect of the invention, there is provided a computing device including a processor and memory, the memory storing computer program code which when executed by the processor is configured to execute the steps of the method according to the first aspect.

DETAILED DESCRIPTION

Figure 1:
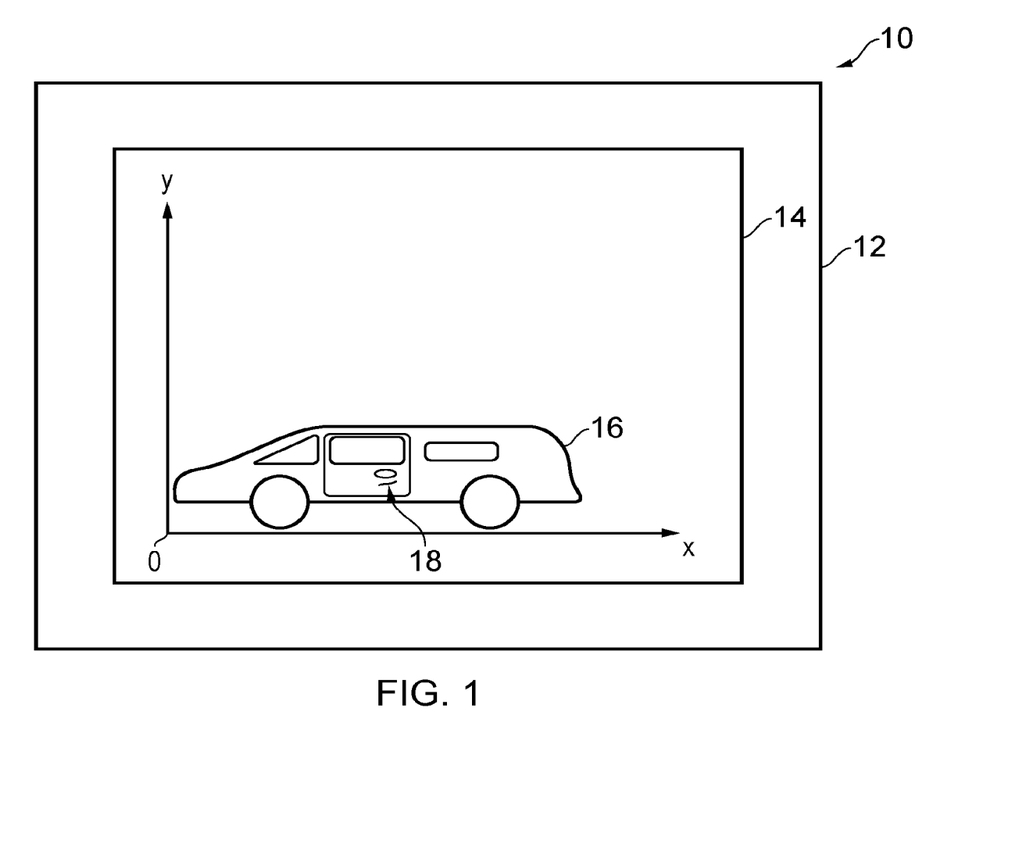
FIG. 1 is a schematic diagram of a graphical user interface (GUI) of apparatus for vehicle damage mapping according to an embodiment of the invention.

FIG. 1 is a schematic diagram of apparatus 10 for vehicle damage mapping according to an embodiment of the invention.

A conventional computing device 12 comprising one or more processors, memory, input device etc. is arranged to execute a control program. The control program implements a method for vehicle damage mapping.

Any suitable computing device 12 can be used and therefore, for brevity, the features of the computing device are not illustrated and will not be discussed in any detail. Examples of suitable computing devices are general purpose computers, smart phones, tablets and the like.

A display device 14 of the computing device 12 is arranged to display a graphical user interface (GUI) via which a user can record the type and location of damage the user has observed on a vehicle (not shown).

The GUI displays an image 16 which represents a particular vehicle. The computing device 12 can include a database in memory which contains images for various vehicles, from which a user can select one. Alternatively, an image can be located from an external database via a wireless or wired communications link.

The control program is arranged to generate a coordinate system, denoted by an X axis and Y axis, relative to the image, which may or may not be visible to the user. The coordinate system has an origin O defined relative to a particular part of the image. In the illustrated embodiment, the Y axis for the coordinate system is aligned with the furthermost forward region of the car bumper and the X axis is aligned with the bottom of the tyres (in both cases a space is shown in FIG. 1 for clarity). However, in other embodiments the coordinate system origin can be based on some other features of the vehicle.

The computing device 12 includes an input device, which in the illustrated embodiment is a touchscreen input 14 of the display device 14, but in other embodiments could be a mouse, trackball or the like.

The input device 14 enables the user to provide one or more types of user input command, which are registered by the control program.

A first type of user input command is a damage location input through which a user can input a damage location marker 18 on the image 16 which corresponds to an instance of observed damage on the vehicle. This can for example be achieved by the input device 14 detecting a single finger gesture at a set of coordinates on the image 16. The computing device 12 can then store the damage location input locally to memory or transmit the information via the communications link.

The coordinates system can be scaled to the vehicle image, which in turn can be scaled to the vehicle. Thus, the control program knows the scale between the image displayed on the display device 14 and the vehicle the image represents and as such the computing device 12 can directly relate damage location co-ordinates to a precise location on the vehicle; for example in mm from the co-ordinate datum point.

Figure 2:
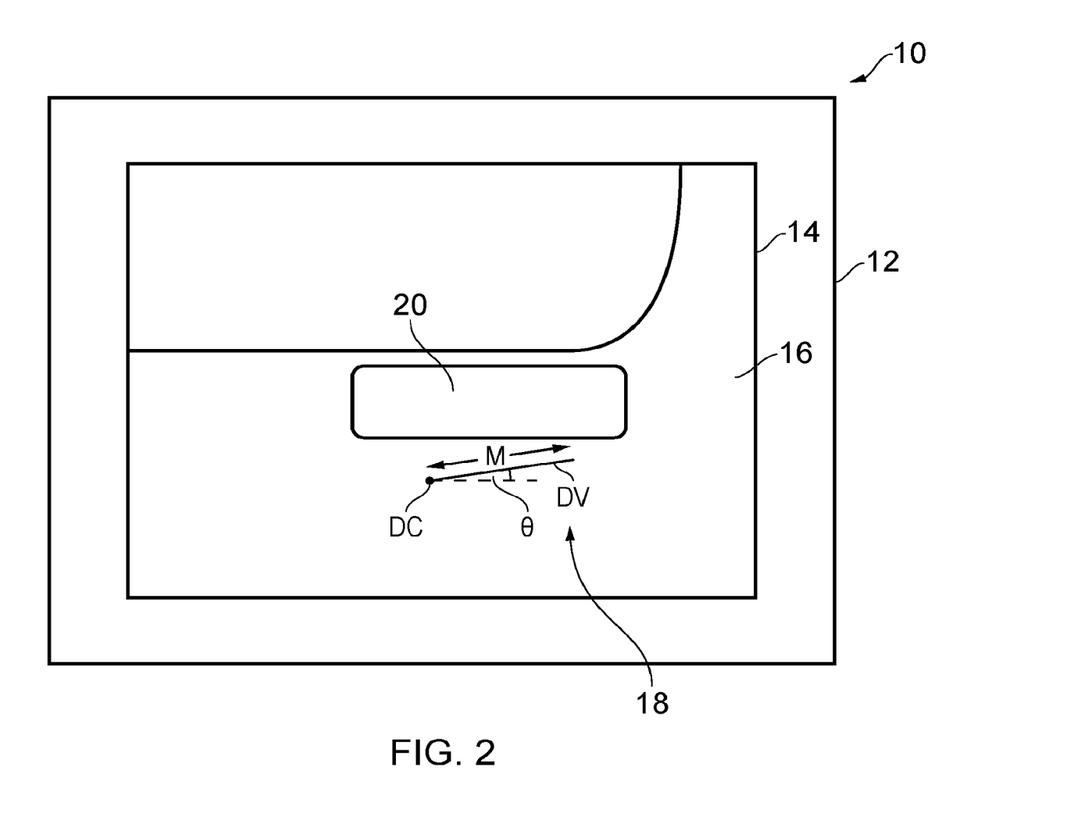
FIG. 2 is a schematic diagram of the GUI of FIG. 1, showing a magnified portion of the vehicle.

Referring additionally to FIG. 2, a second type of user input command can be a zoom input through which a user can magnify a particular portion of the image 16. This can for example be achieved by the input device 14 detecting a two fingered pinch or expand gesture at a set of coordinates on the image 16. FIG. 2 schematically illustrates a user having magnified the portion of the image containing a door handle 20. The input device 14 can be arranged to detect zoom in and zoom out gestures, as well as pan gestures by means which will be apparent to the skilled person. Thus, the apparatus 10 can enable a user to enlarge a relevant portion of the vehicle image 16, which can enable a more accurate damage location input to be made.

It is preferred that the control program is arranged to detect from the damage location input not only the set of coordinates DC on the image 16 but also the magnitude M and direction of the damage from the set of coordinates so as to establish a damage vector DV from the set of coordinates. This can for example be achieved by the input device 14 detecting a user swiping one finger from an initial touch point. The direction can be described as an angle 8 relative to the X or Y axis. The magnitude and direction can be determined using the start and end coordinates of the finger stroke. A straight line approximation can be made for the damage location marker 18, or the swipe can be broken down into a plurality of contiguous damage vectors to describe non-linear damage location markers.

Figure 3:
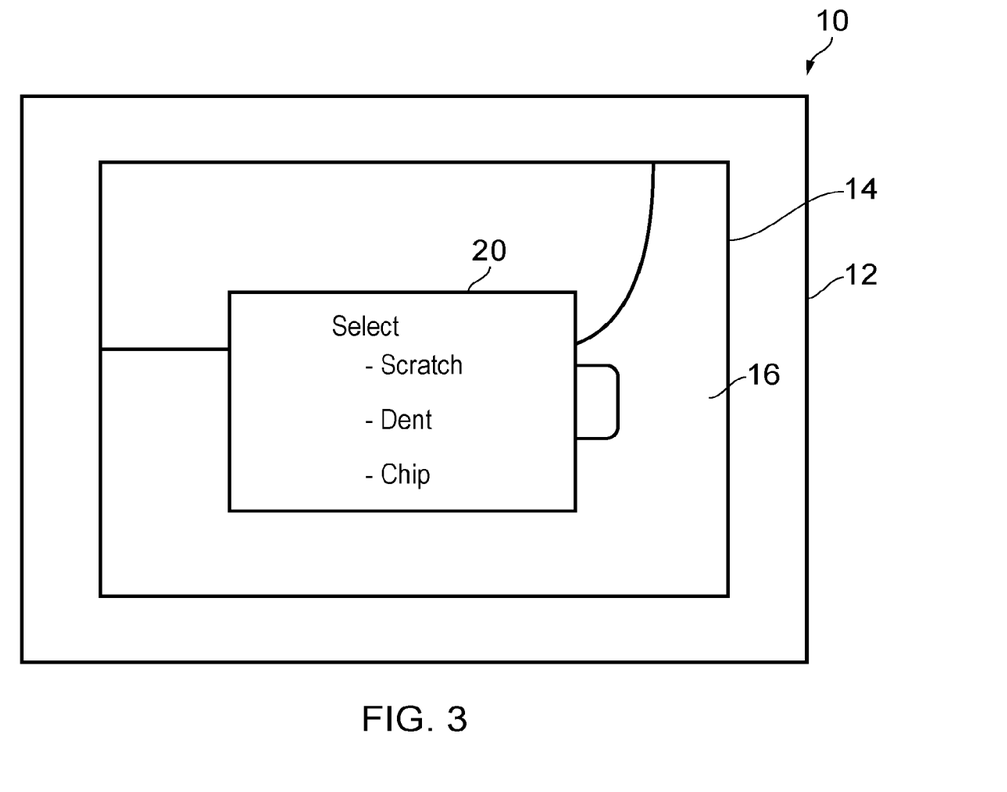
FIG. 3 is a schematic diagram of the GUI of FIG. 1, showing a damage description menu.

Referring additionally to FIG. 3, the control program can be arranged to present the user with a description menu 20 of user selectable damage description options. In the illustrated example the menu enables a user to describe the observed damage as a "scratch", a "dent" or a "chip". The description menu 20 can be automatically displayed in response to the input device detecting damage location input, or the GUI can position a damage description icon (not shown) on the display to enable a user to assign a damage description to a damage location marker 18. The control program can be arranged to store the assigned damage description locally to memory or transmit the information via the communications link. This can result in a more informative or accurate vehicle damage mapping system.

As best illustrated in FIG. 1, the vehicle 16 can be broken down into a number of discrete regions which correspond to discrete or groups of corresponding externally visible components of the vehicle such as panels, windows, door handles etc. It is preferred that the control program is arranged to tailor the description menu 20 presented to the user to only show options that are available for the region(s) in which the damage location marker 18 exists; for example, a menu provided for the door panel can include "scratch", "dent" or "chip" options, but a menu provided for a window can present "scratch", "crack, or "chip" options. This can result in an improved GUI in which a user is not presented with every possible damage description in every menu, thereby simplifying and expediting the process of damage description which can reduce the power consumption of the system and reduce the likelihood of erroneous input.

Figure 4:
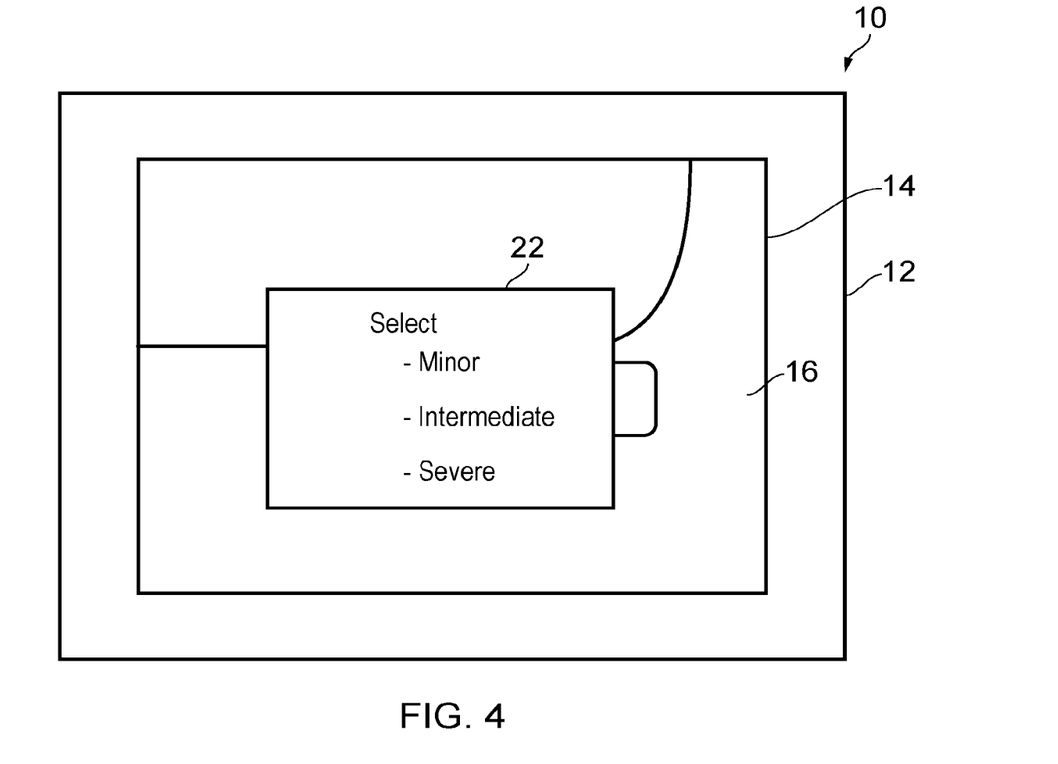
FIG. 4 is a schematic diagram of the GUI of FIG. 1, showing a damage severity menu.

Referring additionally to FIG. 4, the control program can be arranged to present the user with a severity menu 22 of user selectable damage severity options. In the illustrated example the severity menu 22 enables a user to describe the observed damage as "minor", "intermediate" or "severe", but in other embodiments the control program can provide different representations of damage severity level. The severity menu 22 can be automatically displayed in response to the input device detecting damage location input, or the GUI can position a damage severity icon (not shown) on the display to enable a user to assign a damage description to a damage location marker 18. The control program can be arranged to store the assigned damage severity locally to memory or transmit the information via the communications link. This can result in more informative or accurate vehicle damage mapping.

The control program can be arranged to associate each damage location marker 18 with the time and date of recordal in the system; for example, by using the output from the system clock of the computing device 12. This can result in more informative vehicle damage mapping. Alternatively or in addition the control program can be arranged to determine a daylight status i.e. whether it is light or dark at the time and date of detection of the first user input command at the location of the computing device during detection of the first user input command and associate this with the damage location marker 18.

The control program can be arranged to associate each damage location marker 18 with the location of the computing device 12 using for example Global Positioning System information. This can result in more informative vehicle damage mapping.

The control program can be arranged to associate each damage location marker 18 with the weather at the location of the computing device 12 at the time the damage is recorded. This can for example be achieved by the control program using the communications interface of the computing device 12 to access freely available weather databases via the internet and recording one of more information fields from the website. This can result in more informative vehicle damage mapping because an entry made during poor weather conditions may be less credible than one made in sunny conditions.

Figure 5:
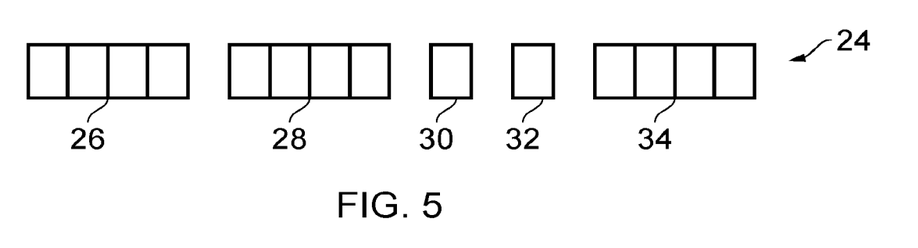
FIG. 5 is a schematic diagram illustrating one example format of storing damage data.

Referring to FIG. 5, the control program can be arranged to save damage information as a code, such as a 14 digit code 24. The first four digits 26 describe in mm the distance of the damage coordinate along the X axis. The second four digits 28 describe in mm the distance of the damage coordinate along the Y axis. The ninth digit 30 describes one of up to nine damage descriptions. The tenth digit 32 described one of up to nine damage severities. The final four digits 34 describe the damage size. The fixed length code can have any suitable length to represent the damage location in addition to one or more further pieces of damage information as described herein. Saving the damage information in a structured code can simplify downstream data collation and comparison. In some embodiments, the system can be arranged to simply save each piece of damage information associated with an instance of damage in a computer file with a common damage instance identifier.

Figure 6:
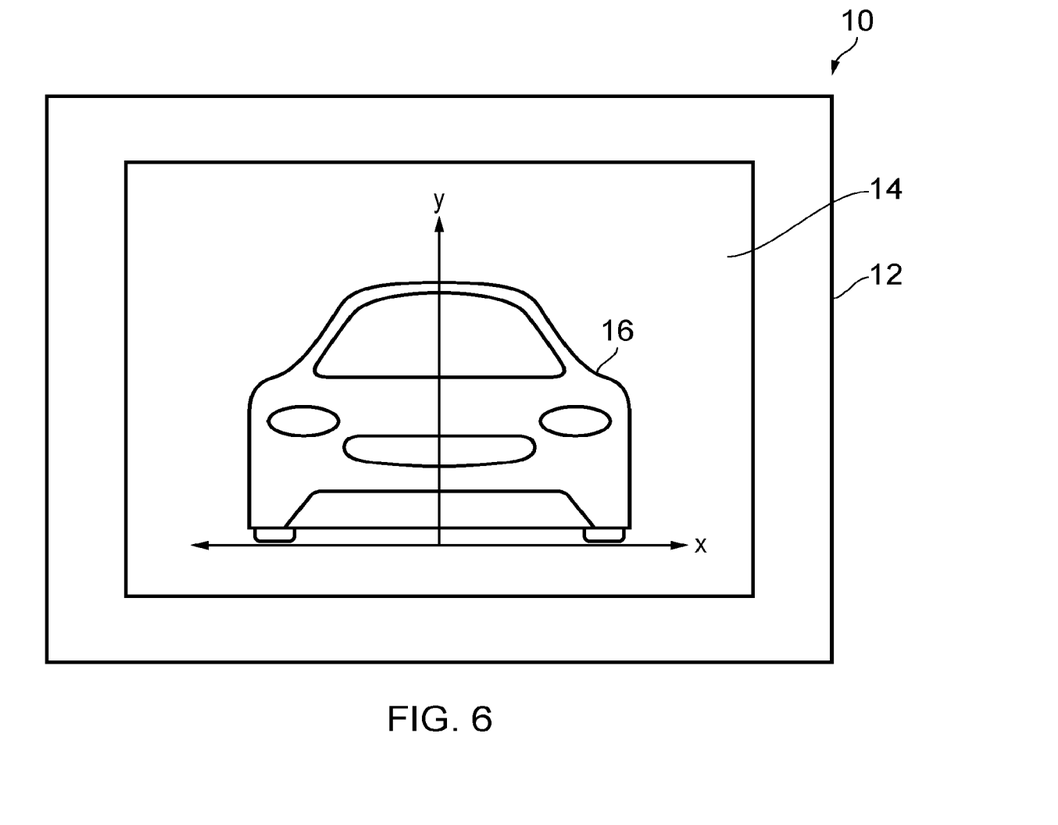
FIG. 6 is a schematic diagram of the GUI of FIG. 1, showing a front image of a vehicle.

FIG. 6 is a schematic diagram of a second image of the vehicle that can be displayed on the GUI. The second image is a front view image of the vehicle, but can also be a back view. The Y axis for the second coordinates system is aligned with the vehicle centre within the image and the X axis intersects or is adjacent to the bottom of the tyres within the image.

Figure 7:
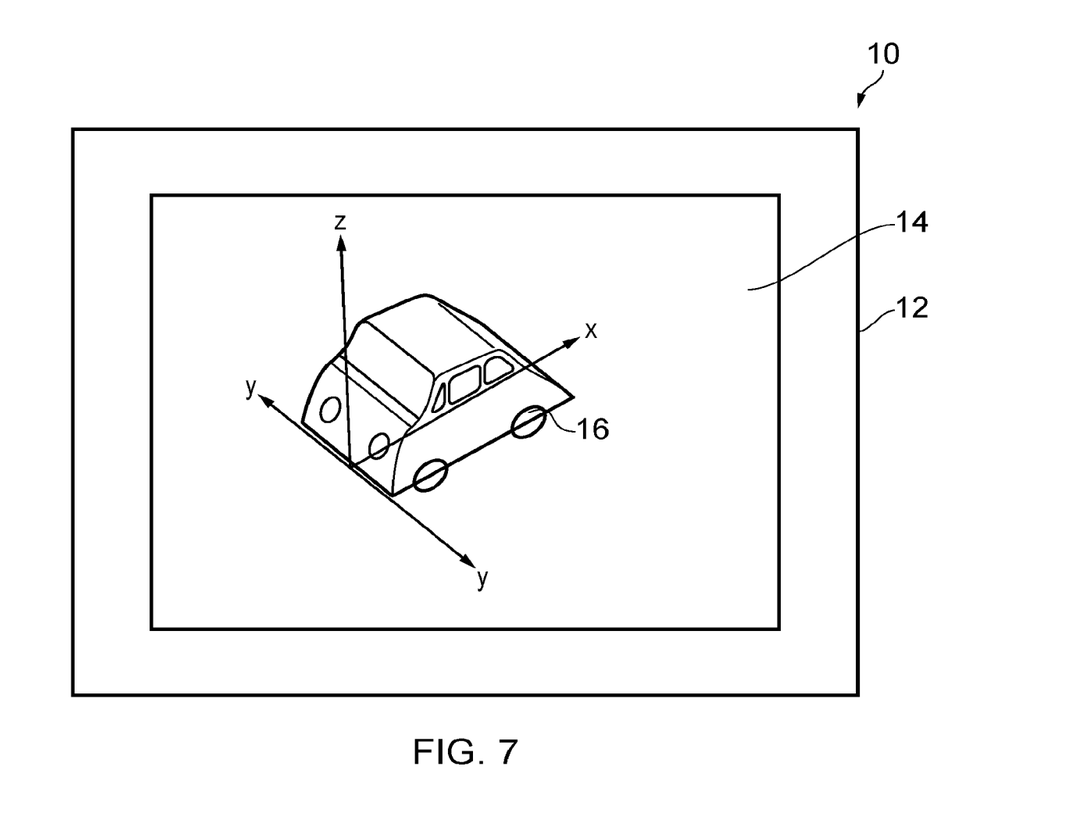
FIG. 7 is a schematic diagram of the GUI of FIG. 1, showing a three dimensional image of a vehicle.

FIG. 7 is a schematic diagram of an alternative first image of the vehicle that can be displayed on the GUI. The first image in this embodiment is a three dimensional model of the vehicle. The Y axis origin for the first coordinate system is aligned with the vehicle longitudinal centre within the image, the X axis intersects or is adjacent to a furthermost forward portion of the front of the bumper of the vehicle within the image when viewed from a side and the Z axis origin intersects or is adjacent to the bottom of the tyres within the image when viewed from the front or side. Thus, a user can rotate the model using the pan command and zoom as with the previous embodiment. When a damage location input is provided, the control program can establish the 3D location of the damage in an analogous manner to that described above.

Figure 8:
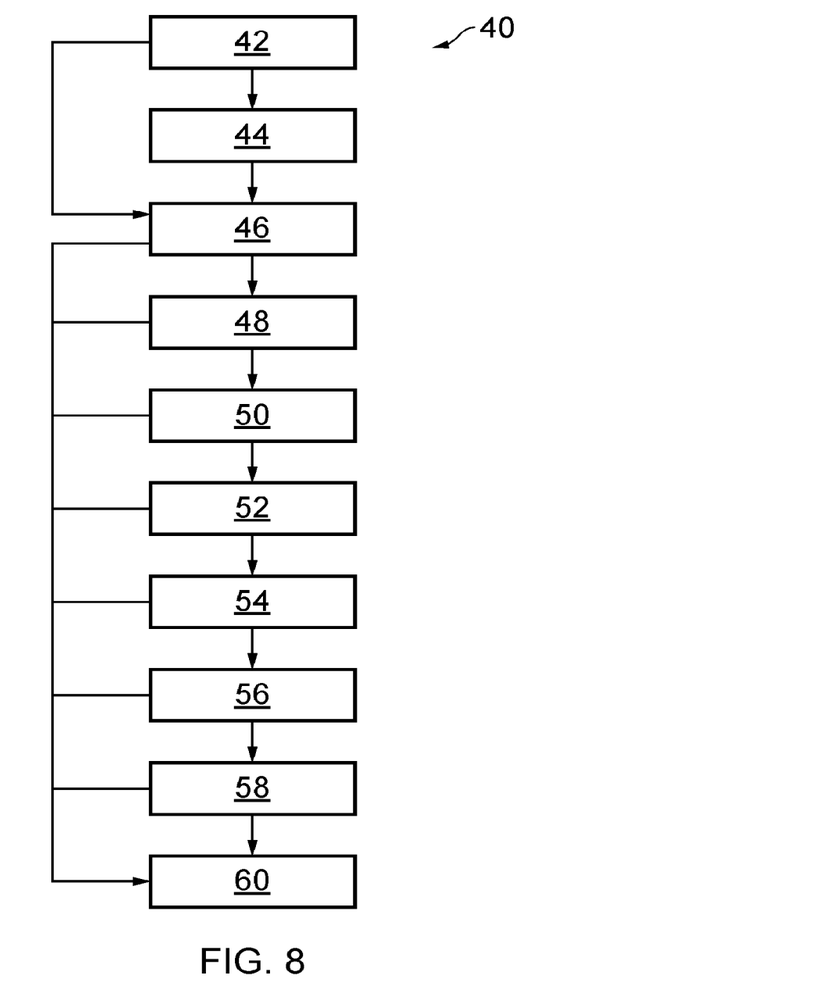
FIG. 8 illustrates a method according to an embodiment of the invention.

FIG. 8 illustrates a method according to an embodiment of the invention generally at 40.

At step 42 the method comprises displaying a graphical user interface on a display device of a computing device which shows a first image representing a first view of a vehicle and defining a first coordinate system relative to the first image.

At step 44 the method comprises an optional step of detecting a second user input command, the second user input command causing the GUI to display a magnified representation of part of the vehicle. This step can be repeated one or more times and the user can pan around the magnified image to select a portion of the vehicle image that corresponds to a portion of the vehicle where damage has been observed.

At step 46 the method comprises detecting a first user input command provided via a user input device associated with the computing device, the first user input command being representative of an instance of damage observed on the vehicle.

At step 48 the method comprises an optional step of detecting a stroke length and/or direction of the first user input command and determining a damage magnitude and/or direction.

At step 50 the method comprises an optional step of partitioning the image into a plurality of regions, each region representing one or more discrete components of the vehicle, determining the region(s) to which the first or second user input command(s) relate and accessing a database containing vehicle information relating to the plurality of regions.

At step 52 the method comprises an optional step of detecting the first or a third user input command provided via the user input device and displaying a damage description menu such that a user can select a damage type corresponding to the observed instance of damage. The method can display only damage types applicable to the region(s).

At step 54 the method comprises an optional step of detecting the first or a fourth user input command provided via the user input device and displaying a damage severity menu such that a user can select a damage severity level corresponding to the observed instance of damage. The method can display only damage severity levels applicable to the region(s).

At step 56 the method comprises an optional step of determining the time and date of detection of the first user input command and/or the location of the computing device during detection of the first user input command. Alternatively or in addition the method can comprise an optional step of determining a daylight status i.e. whether it is light or dark at the time and date of detection of the first user input command at the location of the computing device during detection of the first user input command.

At step 58 the method comprises an optional step of determining a weather condition at the time and date of detection of the first user input command and location of the computing device during detection of the first user input command.

At step 60 the method comprises storing the information associated with the first user input command.

The method can be repeated in an analogous manner for further first input commands, provided on the first image representative of further damage to that side of the vehicle, and/or for further input commands representative of damage to other areas of the vehicle.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A method for mapping damage on a vehicle having tires and a bumper, the method comprising:
    displaying a graphical user interface on a display device of a computing device which shows a first image representing a first view of the vehicle;
    defining a first coordinate system relative to the first image;
    partitioning the first image into a plurality of regions, each region representing a part or a component of the vehicle;
    detecting a first user input command provided via a user input device associated with the computing device, the first user input command being representative of an instance of damage observed on the vehicle; and
    in response to detecting the first user input command, the computing device automatically performing the following:
    detecting a stroke length and stroke direction of the first user input command;
    determining a damage magnitude and damage direction based on the detected stroke length and stroke direction of the first user input command; and
    storing damage information, whereby the storing damage information comprises storing a set of image coordinates of the first coordinate system and a damage vector based on the damage magnitude and damage direction representing the first user input command; and
    determining a region of the plurality of regions to which the first user input command relates;
    accessing a database containing vehicle information relating to the plurality of regions; and
    using the vehicle information to modify selectable menu information displayed on the graphical user interface by displaying only damage types applicable to the region to which the first user input command relates, whereby the modifying selectable menu information displayed on the graphical user interface comprises displaying only damage severity levels applicable to the region to which the first user input command relates.

2. The method according to claim 1, whereby the first image is a three dimensional model of the vehicle, a Y axis origin for the first coordinate system is aligned with a vehicle longitudinal center within the first image, an X axis intersects or is adjacent to a furthermost forward portion of a front of the bumper of the vehicle within the image when viewed from a side and a Z axis origin intersects or is adjacent to a bottom of the tires within the image when viewed from the front or side.

3. The method according to claim 1, whereby the first image is a side view image of the vehicle, a Y axis origin for the first coordinates system intersects or is adjacent to a bottom of the tires within the image and the X axis origin intersects or is adjacent to a furthermost forward portion of a front of the bumper of the vehicle within the first image.

4. The method according to claim 1, further comprising:
    displaying on the display device a second image representing a second view of the vehicle;
    defining a second coordinate system relative to the second image;
    detecting a second user input command provided via the user input command device, the first user input command being representative of an instance of damage on the vehicle;
    whereby the storing damage information comprises storing one or more sets of image coordinates representing the second user input command to map damage to the vehicle.

5. The method according to claim 4, whereby the second image is a front or back view image of the vehicle, a Y axis origin for the second coordinates system intersects or is adjacent to a bottom of the tires and an X axis origin is aligned with a center of the vehicle within the second image.

6. The method according to claim 1, further comprising:
    prior to the detecting the first user input command, detecting a second user input command, the second user input command causing the GUI to display a magnified representation of part of the vehicle.

7. The method according to claim 6, further comprising one or more further steps of detecting the second user input command, each second user input command causing the GUI to display a further magnified representation of the part of the vehicle.

8. The method according to claim 1, further comprising:
   detecting the first or a third user input command provided via the user input device;
   displaying a damage description menu such that a user can select a damage type corresponding to the observed instance of damage; and
   whereby the storing damage information comprises storing the user selected damage type associated with the first user input command.

9. The method according to claim 1, further comprising:
   detecting the first or a fourth user input command provided via the user input device;
   displaying a damage severity menu such that a user can select a damage severity level corresponding to the observed instance of damage; and
   whereby the storing damage information comprises storing the user selected damage severity level associated with the first user input command.

10. The method according to claim 1, further comprising determining a time and date of detection of the first and/or second user input commands and/or daylight status and/or a location of the computing device during detection of the first and/or second user input commands and whereby the storing damage information comprises storing the time and date and/or daylight status and/or location information associated with the first and/or second user input commands.

11. The method according to claim 1, further comprising determining a weather condition at a time and date of detection of the first user input command and location of the computing device during detection of the first user input command and whereby the storing damage information comprises storing the weather information associated with the first user input commands.

12. The computing device including a processor and memory, the memory storing computer program code which when executed by the processor is configured to execute the steps of the method according to claim 1.

13. A method for mapping damage on a vehicle having tires and a bumper, the method comprising:
   displaying a graphical user interface on a display device of a computing device which shows a first image representing a first view of the vehicle;
   defining a first coordinate system relative to the first image;
   partitioning the first image into a plurality of regions, each region representing a part or a component of the vehicle;
   detecting a first user input command provided via a user input device associated with the computing device, the first user input command being representative of an instance of damage observed on the vehicle; and
   in response to detecting the first user input command, automatically performing the following computer implemented functions:
   detecting a stroke length and stroke direction of the first user input command;
   determining a damage magnitude and damage direction based on the detected stroke length and stroke direction of the first user input command; and
   storing damage information, whereby the step of storing damage information comprises storing a set of image coordinates and a damage vector based on the damage magnitude and damage direction representing the first user input command; and
   determining the region to which the first user input command relates;
   accessing a database containing vehicle information relating to the plurality of regions; and using the vehicle information to modify selectable menu information displayed on the graphical user interface by displaying only damage types applicable to the region to which the first user input command relates, whereby the storing damage information comprises storing the damage information as a fixed length multi digit code representative of the damage information, at least some of the digits of the fixed length multi digit code representing the coordinates and at least some of the digits of the fixed length multi digit code representing damage vector.

* * * * *